(12) United States Patent
Matsui

(10) Patent No.: US 8,250,274 B2
(45) Date of Patent: *Aug. 21, 2012

(54) PORTABLE TERMINAL AND USB DEVICE

(75) Inventor: Naoya Matsui, Tokyo (JP)

(73) Assignee: Sony Computer Enterainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/004,346

(22) Filed: Jan. 11, 2011

(65) Prior Publication Data

US 2011/0113175 A1    May 12, 2011

Related U.S. Application Data

(63) Continuation of application No. 11/123,867, filed on May 6, 2005, now Pat. No. 7,895,384.

(30) Foreign Application Priority Data

May 10, 2004   (JP) ................. 2004-140421

(51) Int. Cl.
   *G06F 13/00*    (2006.01)
   *G06F 1/00*     (2006.01)
(52) U.S. Cl. ...................... 710/300; 713/300
(58) Field of Classification Search .......... 710/300; 713/300

See application file for complete search history.

(56) References Cited

U.S. PATENT DOCUMENTS

| | | |
|---|---|---|
| 357,180 A | 2/1887 | Coy |
| 2,122,546 A | 7/1938 | Borden |
| 3,571,780 A | 3/1971 | Boenning et al. |
| 5,675,813 A | 10/1997 | Holmdahl |
| 5,836,783 A | 11/1998 | Morisawa et al. |
| 6,076,119 A * | 6/2000 | Maemura et al. ........... 710/15 |

(Continued)

FOREIGN PATENT DOCUMENTS

CN    1308261    8/2001

(Continued)

OTHER PUBLICATIONS

United States Office Action dated Dec. 12, 2006, from corresponding U.S. Appl. No. 11/123,867.

(Continued)

*Primary Examiner* — Paul R Myers
*Assistant Examiner* — Christopher A Daley
(74) *Attorney, Agent, or Firm* — Katten Muchin Rosenman LLP

(57) ABSTRACT

The present invention helps to develop a smaller sized portable terminal without reducing the functions available for the user. A USB device which is detachable from the portable terminal is provided with a USB connector which is inserted into a USB port of the portable terminal, a power source terminal which comes into contact with a power supply terminal of the portable terminal, when the USB connector is inserted into the USB port of the portable terminal, and a screw which is engaged with a screw hole of the portable terminal. When the screw is engaged with the screw hole of the portable terminal, a switch inside the screw hole is pushed down due to a contact with the screw. The portable terminal detects mounting of the USB device by an output from the switch, and initiates power supplying from the power supply terminal of the portable terminal to the power source terminal of the USB device. The USB device is started up by this power, and establishes connection with the portable terminal via the USB connector.

8 Claims, 6 Drawing Sheets

U.S. PATENT DOCUMENTS

| | | | |
|---|---|---|---|
| 6,131,134 A | 10/2000 | Huang et al. | |
| 6,315,609 B1 | 11/2001 | Chung | |
| 6,415,342 B1 | 7/2002 | Wahl et al. | |
| 6,449,438 B1 | 9/2002 | Gennetten | |
| 6,530,838 B2 | 3/2003 | Ha et al. | |
| 6,633,932 B1 | 10/2003 | Bork et al. | |
| 6,648,661 B1 | 11/2003 | Byrne et al. | |
| 6,659,805 B2 | 12/2003 | Siddiqui et al. | |
| 6,668,296 B1 | 12/2003 | Dougherty et al. | |
| 6,718,416 B1 | 4/2004 | Self et al. | |
| 6,727,952 B1 | 4/2004 | Hirata et al. | |
| 6,774,604 B2 | 8/2004 | Matsuda et al. | |
| 6,790,094 B1 | 9/2004 | Bergmann et al. | |
| 6,810,481 B1 * | 10/2004 | Kawade et al. | 713/300 |
| 6,894,902 B2 | 5/2005 | Chang | |
| 6,901,274 B2 | 5/2005 | Idani et al. | |
| 6,904,532 B2 * | 6/2005 | Matsumoto | 713/320 |
| 6,909,906 B1 | 6/2005 | Miyashita | |
| 7,028,126 B1 | 4/2006 | Liang | |
| 7,050,044 B2 | 5/2006 | Liu | |
| 7,079,970 B2 | 7/2006 | Nicodem et al. | |
| 7,085,876 B2 * | 8/2006 | Lai et al. | 710/313 |
| 7,114,030 B2 | 9/2006 | Teicher et al. | |
| 7,142,897 B2 | 11/2006 | Kim et al. | |
| 7,360,004 B2 | 4/2008 | Dougherty et al. | |
| 7,411,607 B2 | 8/2008 | Kikugawa | |
| 2001/0006884 A1 | 7/2001 | Matsumoto | |
| 2002/0050936 A1 | 5/2002 | Kato et al. | |
| 2002/0162036 A1 * | 10/2002 | Kim et al. | 713/300 |
| 2003/0052547 A1 | 3/2003 | Fischer et al. | |
| 2003/0070103 A1 | 4/2003 | Kim | |
| 2003/0121981 A1 | 7/2003 | Slutsky et al. | |
| 2003/0153214 A1 | 8/2003 | Siddiqui et al. | |
| 2004/0042138 A1 * | 3/2004 | Saito et al. | 361/90 |
| 2004/0059784 A1 | 3/2004 | Caughey | |
| 2004/0103223 A1 * | 5/2004 | Gabehart et al. | 710/2 |
| 2004/0189808 A1 | 9/2004 | Tanaka | |
| 2004/0221180 A1 | 11/2004 | Enami et al. | |
| 2005/0006483 A1 * | 1/2005 | Fruhauf | 235/492 |
| 2005/0009404 A1 | 1/2005 | Lee | |
| 2005/0050234 A1 | 3/2005 | Choi | |
| 2005/0114719 A1 | 5/2005 | Stedman et al. | |
| 2005/0165274 A1 | 7/2005 | Abe | |
| 2005/0233738 A1 * | 10/2005 | Miura | 455/418 |
| 2005/0240704 A1 | 10/2005 | Leaming | |
| 2006/0076977 A1 | 4/2006 | Zhu | |

FOREIGN PATENT DOCUMENTS

| | | |
|---|---|---|
| CN | 1459691 | 12/2003 |
| EP | 0 803 793 | 10/1997 |
| EP | 1 113 355 | 7/2001 |
| EP | 1113355 | 7/2001 |
| EP | 1 333 360 | 8/2003 |
| GB | 2 409 058 | 6/2005 |
| JP | 55-121518 | 9/1980 |
| JP | 3-223915 | 10/1991 |
| JP | 4-238517 | 8/1992 |
| JP | 8-185931 | 7/1996 |
| JP | 8-234872 | 9/1996 |
| JP | 10-124194 | 5/1998 |
| JP | 10-301898 | 11/1998 |
| JP | 11-144040 | 5/1999 |
| JP | 2000-174450 | 6/2000 |
| JP | 2000-181585 | 6/2000 |
| JP | 2001-184147 | 7/2001 |
| JP | 2002-237972 | 8/2002 |
| JP | 2002-297264 | 10/2002 |
| JP | 2003-162347 | 6/2003 |
| JP | 2003-216378 | 7/2003 |
| JP | 2003-337784 | 11/2003 |
| JP | 2004-104998 | 4/2004 |
| JP | 2004-118261 | 4/2004 |
| KR | 1999-0041885 | 12/1999 |
| KR | 2001-0062727 | 7/2001 |
| KR | 2001-0086335 | 9/2001 |
| TW | 464084 | 11/2001 |
| TW | 536040 | 6/2003 |
| TW | 558036 | 10/2003 |
| WO | 02/065264 | 8/2002 |

OTHER PUBLICATIONS

United States Office Action dated May 31, 2007, from corresponding U.S. Appl. No. 11/123,867.
United States Office Action dated Nov. 6, 2007, from corresponding U.S. Appl. No. 11/123,867.
United States Office Action dated Jun. 18, 2008, from corresponding U.S. Appl. No. 11/123,867.
United States Office Action dated Jan. 22, 2009, from corresponding U.S. Appl. No. 11/123,867.
United States Office Action dated Jun. 9, 2009, from corresponding U.S. Appl. No. 11/123,867.
United States Office Action dated Sep. 23, 2009, from corresponding U.S. Appl. No. 11/123,867.
United States Office Action dated May 5, 2010, from corresponding U.S. Appl. No. 11/123,867.
United States Office Action dated Jun. 28, 2010, from corresponding U.S. Appl. No. 11/123,867.
Great Britain Search Report dated Aug. 4, 2005, from corresponding GB Application No. GB0509534.4.
Great Britain Search Report dated Feb. 28, 2006, from corresponding GB Application No. GB0600935.1.
Great Britain Search Report dated Aug. 4, 2006, from corresponding GB Application No. GB0509534.4.
Chinese Office Action dated Apr. 13, 2007, from corresponding CN Application No. 2005100701924.
Chinese First Office Action dated May 9, 2008, from corresponding Chinese Application No. 200710084454.1.
French Search Report dated Nov. 24, 2005, from corresponding French Application No. 0504696.
Decision of Refusal dated Sep. 16, 2008, from corresponding Japanese Application No. 2005-137369.
Taiwanese Office Action dated Sep. 9, 2008, from corresponding Taiwanese Application No. 094114741.
Notification of Reasons for Refusal dated Oct. 26, 2010, from corresponding Japanese Application No. 2008-292982.
Korean Notice of Preliminary Rejection dated Sep. 27, 2007, from corresponding Korean Application No. 10-2005-38348.
Taiwanese Office Action dated Aug. 28, 2007, from corresponding Taiwanese Application No. 094114741.
Notification of Reasons for Refusal dated Feb. 19, 2008, from corresponding Japanese Application No. 2005-137369.
Notification of Reasons for Refusal dated Mar. 8, 2011, from corresponding Japanese Application No. 2008-292982.

* cited by examiner

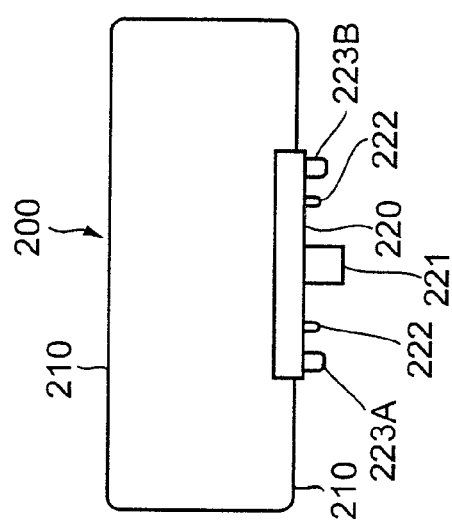
FIG. 3C
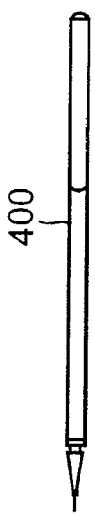
FIG. 3D
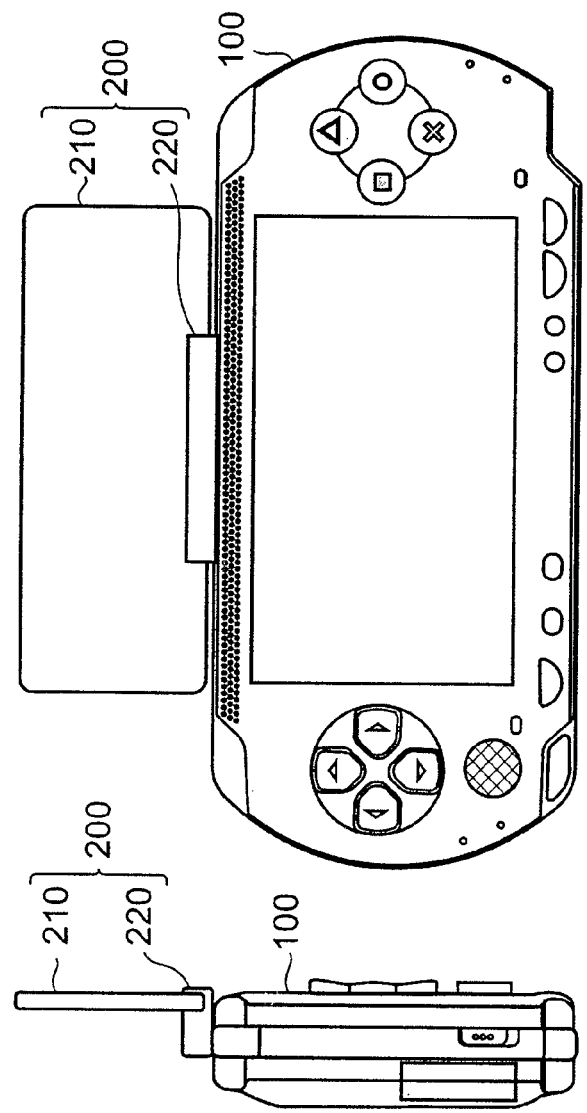
FIG. 3B
FIG. 3A

PORTABLE TERMINAL AND USB DEVICE

BACKGROUND OF THE INVENTION

The present invention relates to a structure of a portable terminal and a USB device used thereon.

As a portable terminal designed for game, there is known a portable type game machine as disclosed in Japanese Patent Laid-open Publication No. H11-144040. A camera is rotatably fixed on a housing of this portable type game machine.

SUMMARY OF THE INVENTION

However, the camera installed on this portable game machine as described above may not be used constantly. On the other hand, this kind of camera may cause upsizing of the portable type game machine.

The present invention helps to develop a smaller sized portable terminal without reducing the functions available for a user.

According to one aspect of the present invention, there is provided a portable terminal including, a USB port into which a USB connector of a USB device is inserted, a housing on which there is formed a screw hole into which a screw provided on the USB device is fixed, a power supply terminal for supplying power to a power source terminal of the USB device, which comes into contact with the power source terminal in a state that the USB connector is inserted in the USB port, and a switch provided inside the screw hole, and turned on by a contact with the screw inserted inside the screw hole.

According to one aspect of the present invention, there is provided an USB device including, a USB connector which is inserted into a USB port of a portable terminal, a power source terminal which comes into contact with the power supply terminal of the portable terminal in a state that the USB connector is inserted into the USB port, and a screw which is installed at a position being associated with a screw hole of the portable terminal so as to be fixed to the screw hole, in a state that the USB connector is inserted into the USB port.

According to another aspect of the present invention, there is provided a portable terminal including, a USB port into which a USB connector of a USB device is inserted, a power supply terminal for supplying power to a power source terminal so as to start up the USB device, which comes into contact with the power source terminal of the USB device in a state that the USB connector is inserted in the USB port, and a controller which initiates supplying the power from the power supply terminal, when an application program for utilizing the USB device is started.

In addition, there is provided an USB device including, a USB connector which is inserted into a USB port of a portable terminal, a power source terminal which comes into contact with a power supply terminal of the portable terminal in a state that the USB connector is inserted in the USB port, and a controller which outputs a connection establishment request from the USB connector, when power supplying from the power supply terminal to the power source terminal is initiated.

According to the present invention, it is possible to develop a smaller sized portable terminal without reducing the functions available for the user.

BRIEF DESCRIPTION OF THE DRAWINGS

FIGS. 3A to 3D are an illustration to explain external view of a character input keyboard module according to an embodiment of the present invention.

DETAILED DESCRIPTION OF THE PREFERRED EMBODIMENTS

One embodiment of the present invention will be explained with reference to the accompanying drawings.

At first, a configuration of the portable terminal according to the present embodiment will be explained.

Figure 1:
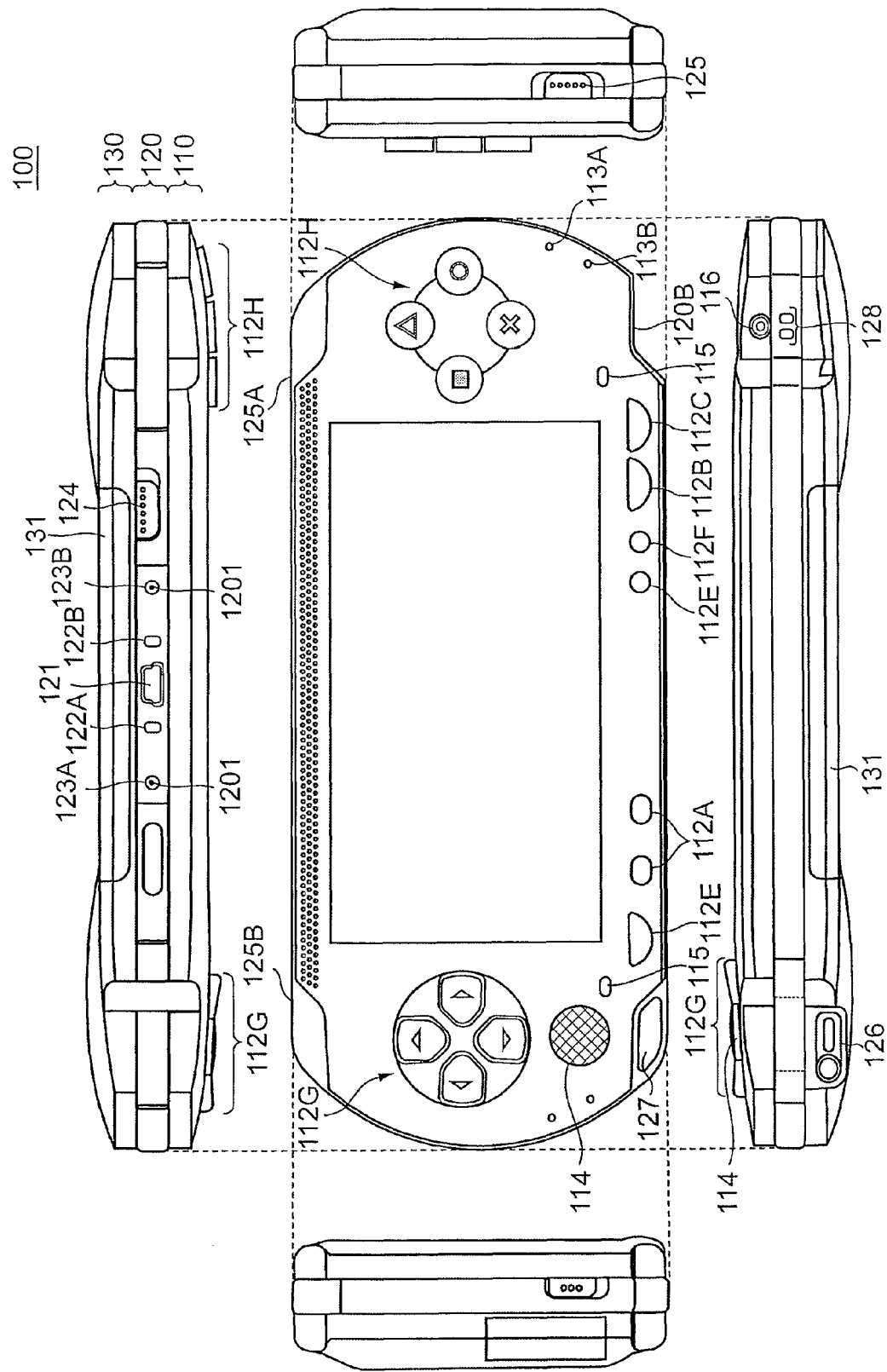
FIG. 1 is an illustration to explain external view of a portable terminal according to an embodiment of the present invention.
Figure 2:
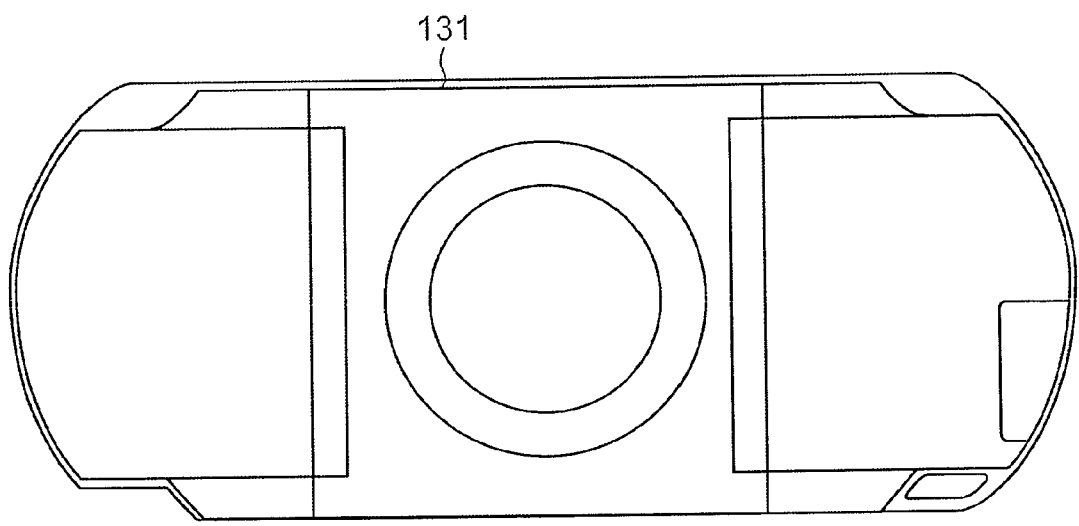
FIG. 2 is a rear view of the portable terminal as shown in FIG. 1.

As shown in FIG. 1 and FIG. 2, the portable terminal 100 according to the present embodiment includes as members to constitute the housing, a metal frame-like chassis 120 which contains various electronic components such as an processing unit, right-and-left speakers, and a drive, and a pair of resinous cases 110 and 130 (hereinafter referred to as "front case" and "back case"), that are respectively installed on the both sides of chassis 120 to cover a space inside the chassis 120.

On the back case 130, there is provided an openable and closable cover 131 of the drive for mounting a disk.

In addition, there are provided on the side of the chassis 120, an open button 124 to open and close the cover 131 of the drive, a power button 125 to switch between power-ON and power-OFF, R button 125A, and L button 125B. Since the chassis 120 possesses higher stiffness than the front case 110 and the back case 130, there is formed on the corner of the chassis 120, a strap-use hole 127 through which a carabiner (an attachment) of the strap is placed. Similarly, for reasons of strength, the chassis 120 is provided with, for example, coupling parts such as a jack 126 into which a plug of a head phone is inserted, a charging use terminal 128 that is connected with a terminal of battery charger (hereinafter, referred to as "cradle"), USB port 121 with which a USB connector of USB device is engaged, and power supply terminals 122A and 122B to supply power to the USB device. On both side positions of the USB port 121, there are formed screw holes 123A, 123B with which screws for fixing the USB device are engaged.

In the present embodiment, the portable terminal 100 functions as a USB slave, and the USB device functions as a USB master. Therefore, it is not allowed to establish connection with the USB device from the portable terminal 100 side. Considering this situation, in the present embodiment, in order that the portable terminal 100 can detect the engagement between fixing screws of the USB device and the screw holes 123A, 123B (i.e., mounting of the USB device), there are provided on the bottom of the screw holes 123A, 123B of the chassis 120, switches 1201 to be pushed down by the tips of the screws, respectively, which have been inserted up to a predetermined depth or more. With the configuration above, when the portable terminal 100 detects by an output signal from the switches 1201 the USB device has been mounted, it starts up the USB device. Detailed description of this operation will be given below.

Here, the switches 1201 for detecting attachment of the USB device are provided on the bottom of the screw holes 123A, 123B of the chassis 120. However, the configuration is not necessarily limited to this. For example, it is possible to configure such that a switch may be provided inside the USB port, which is pushed down by the tip of the USB connector having been inserted up to a predetermined depth or more. Alternatively, the power supply terminals 122A, 122B may serve as switches which are pushed down by the power source terminals 222.

The front case 110 is provided with a liquid crystal display 111, various buttons to accept a directive from a user (for example, volume button 112A to accept volume control, select button 112B to accept a selecting instruction, start button 112C to accept a starting instruction, button 112D to accept an instruction to resume a home mode, display button 112E to accept ON/OFF switching instruction for the back light of the display 111, sound button 112F to accept sound ON/OFF switching instruction, operation buttons 112G, 112H available for inputting to accept various instructions to be given to an application program and the like), analogue pad 114 to accept directional indication from a user, LED turned on and/or turned out according to the status of the portable terminal 100 (for example, LED 113A indicating ON/OFF status of the power source, LED 113B indicating whether or not the portable terminal 100 is in HOLD status), and DC terminal 116 into which DC connector from AC adaptor or an extended buttery is inserted. Furthermore, there is formed a duct hole 115 and the like on the front case 110.

Next, various accessories to be attached to this portable terminal 100 will be explained.

As described above, the portable terminal 100 according to the present embodiment functions as a slave of a USB device so that the portable terminal 100 is allowed to be connected, for example, with a personal computer and the like. Then, the USB device functioning as a USB master can be mounted on the USB port of the portable terminal 100. A user is allowed to appropriately select a required USB device to be mounted out of various USB devices functioning as a master and utilize the USB device thus mounted. Accordingly, an optional device can be mounted on the portable terminal 100 only when the function thereof is required, even if the portable terminal 100 is not constantly equipped with such device. Therefore, it is possible to downsize the portable terminal 100 without reducing the functions available for the user.

As a specific example of such USB device as described above, a character input keyboard module, a portable phone module, a GPS receiver, a camera module, and the like are given. Hereinafter, those USB devices will be explained.

(1) Character Input Keyboard Module

FIG. 3A to 3D show a portable terminal 100 on which the character input keyboard module is mounted.

As shown in FIGS. 3A to 3C, the character input keyboard module 200 includes a touch panel 210 which outputs a signal indicating a position which a stylus pen 400 in FIG. 3D, a user's finger or the like touches, and a communication device 220 which transmits to the portable terminal 100 a signal corresponding to an output from the touch panel 210.

On the touch panel 210, there are described characters (or character strings) or illustrations corresponding to keys for intended purpose. When the stylus pen 400 and the like touches a position where any of those characters or character strings are described, a signal indicating the position (i.e., a signal which identifies a character and the like described in the position touched by the stylus pen 400 or the like) is inputted into the communication device 220 from the touch panel 210. For example, on the touch panel of the character input keyboard, there are described characters (not illustrated) and the like indicating keys such as alphabet, shift key, and control key, necessary for inputting characters. Therefore, the user makes the stylus pen 400 and the like to come into contact with a position where such characters and the like are described, whereby it is possible to input in the communication device 220, a signal identifying a character and the like intended for inputting.

The communication device 220 includes, a USB connector 221 which is inserted in the USB port 121 of the portable terminal 100 with an appropriate play, power source terminals 223 which respectively come into contact with the power supply terminals 122A, 122B of the portable terminal 100 in a state that the USB connector 221 is inserted into the USB port 121 of the portable terminal 100, and screws 223A and 223B which are respectively engaged with the screw holes 123A and 123B of the portable terminal 100 to push down switches 1201.

(2) Portable Phone Module

The portable phone module includes a touch panel that outputs a signal indicating a position which a stylus pen 400 or a user's finger or the like touches, and a USB radio communication device which performs two-way radio communication with a base station. Appearance of the portable phone module is approximately the same as that of the character input keyboard module 200, but on the touch panel of the portable phone module, there are described characters and the like indicating keys (numeric key, hold key, and the like) necessary for use of the portable phone functions.

(3) GPS Receiver

Figure 4:
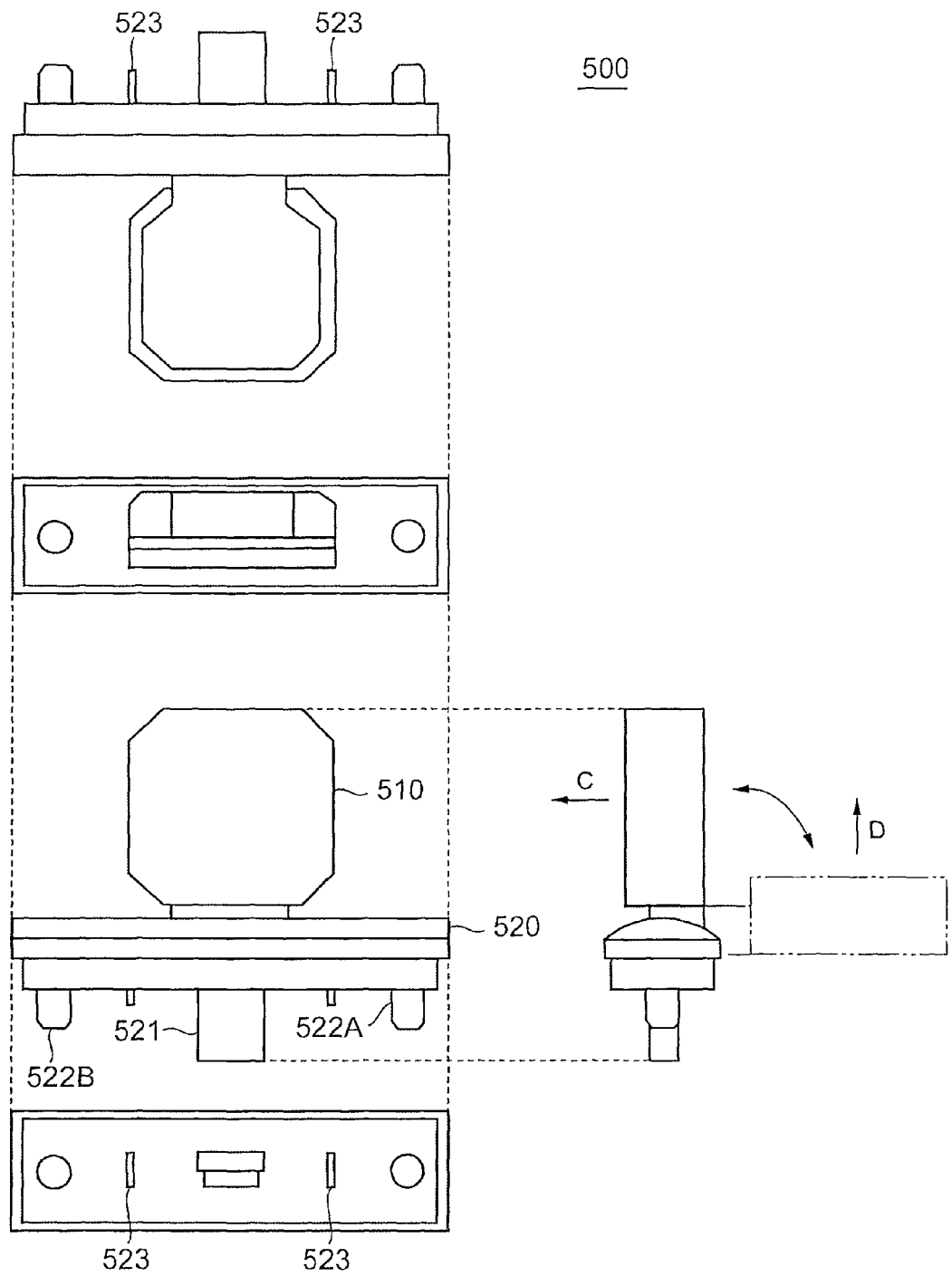
FIG. 4 is an illustration to explain external view of a GPS module according to an embodiment of the present invention.

FIG. 4 shows a schematic view of the GPS receiver 500 which is mounted on the portable terminal 100.

The GPS receiver 500 includes a GPS antenna 510 which receives a radio wave used for positional measurement from a satellite, a communication device 520 which measures latitude and longitude of the current position according to the radio wave thus received by the GPS antenna 510 and transmits the measurement result to the portable terminal 100, an antenna-posture-adjustment rotational shaft (not illustrated) which holds the GPS antenna rotatably, both in a direction to be tilted towards the back case 130 of the portable terminal 100 on which the antenna is mounted, and in a direction for returning the antenna to its original position.

The GPS antenna 510 becomes more sensitive when the receiving plane comes into a horizontal status. Therefore, it is preferable that the GPS antenna 510 is rotatable from the angle at which the receiving plane faces to the thickness direction C of the portable terminal 100 on which the antenna is mounted, to the angle at which the receiving plane faces to a predetermined direction D being upper direction of the portable terminal 100 (the angle at which the receiving plane becomes approximately horizontal in a status that the portable terminal 100 is placed on the cradle), so that the orientation of the receiving plane of the GPS antenna 510 is adjusted according to the posture of the portable terminal 100 being used.

The communication device 520 includes, similar to the key board module, a USB connector 521 which is inserted with an appropriate play into the USB port 121 of the portable terminal 100, a power source terminals 523 which are respectively connected with the power supply terminals 122A, 122B of the portable terminal 100, and screws 522A and 522B which are respectively engaged with the screw holes 123A and 123B of the portable terminal 100 to push down switches 1201.

(4) Camera Module

Figure 5:
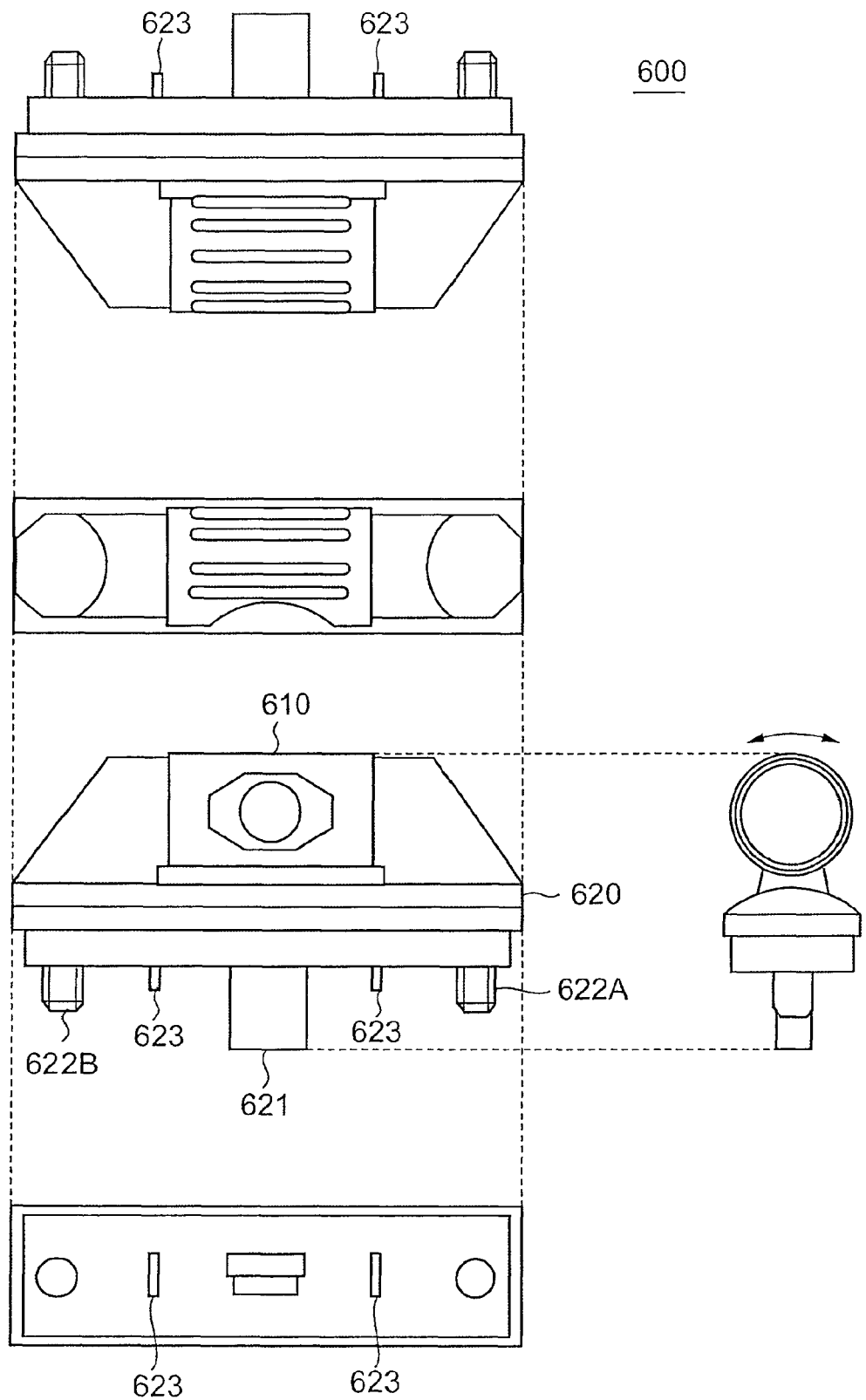
FIG. 5 is an illustration to explain external view of a camera module according to an embodiment of the present invention.

FIG. 5 shows an overview of the camera module 600 which is mounted on the portable terminal 100.

The camera module 600 includes a camera 610, communication device 620 which transmits an output from the camera 610 to the portable terminal 100, and a rotational shaft which rotatably holds the camera 610 so that an area as a shooting target can be changed. The communication device 620 includes, similar to the keyboard module and the like, a USB connector 621 which is inserted with an appropriate play into the USB port of the portable terminal 100, a power source terminals 623 which are respectively connected with the power supply terminals 122A, 122B of the portable terminal 100, and screws 622A and 622B which are respectively engaged with the screw holes 123A and 123B of the portable terminal 100 to push down switches 1201.

The USB devices and the portable terminal 100 as described above are provided with the following functional configurations.

Figure 6:
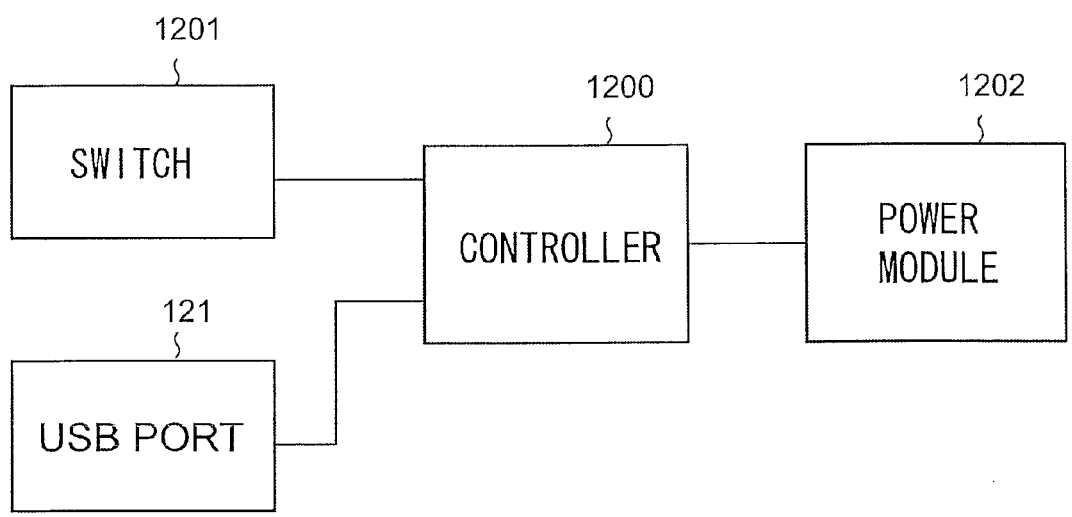
FIG. 6 is a functional diagram showing the portable terminal according to an embodiment of the present invention.

As shown in FIG. 6, the portable terminal 100 includes, switches 1201 inside the screw holes 123A, 123B, the USB port 121 into which any of the USB connectors (221, 521, 621 and the like, collectively called as "USB connector 1400" as a whole) of the USB device is inserted, a power module 1202 which controls starting and stopping of power supply from the power supply terminals 122A, 122B, and a controller 1200 (implemented by the OS and the processing unit and the like) which executes a control of power module 1202 based on the status of the switches 1201 and a communication control via the USB port 121 and the like.

Figure 7:
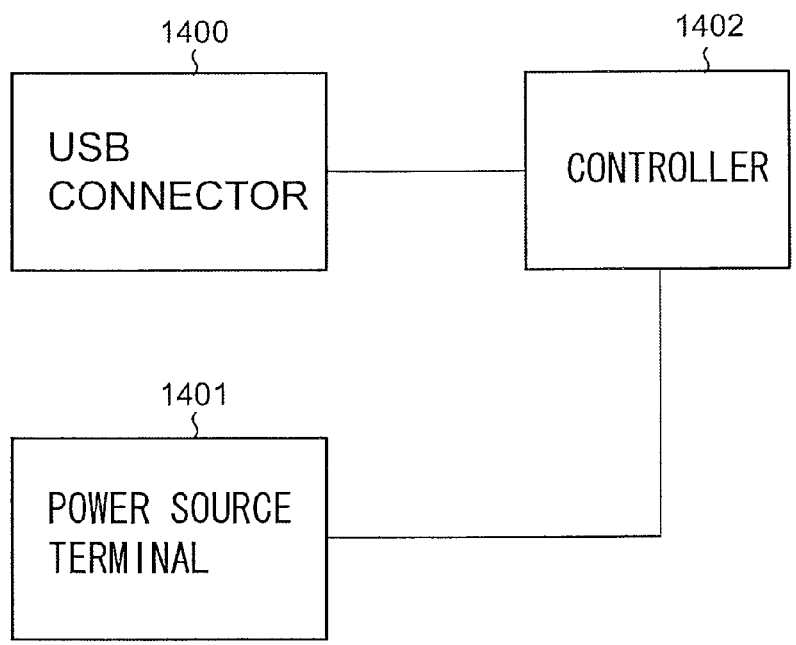
FIG. 7 is a functional diagram showing a USB device according to an embodiment of the present invention.

On the other hand, as shown in FIG. 7, the USB device includes, a USB connector 1400 to be inserted into the USB port 121 of the portable terminal 100, power source terminals (222, 523, 623 and the like, collectively called as power source terminal 1401) which receive power supply from the portable terminal 100, and a controller 1402 which executes a connection establishment processing and the like with the portable terminal 100, when it is started up by the power supplied from the portable terminal 100 via the power source terminal 1401.

With the functional configuration as described above, the following processing is executed between the USB device and the portable terminal 100.

i) Connection Establishment Processing

When the USB connector 1400 of the USB device is inserted into the USB port 121 of the portable terminal 100, and the screws 622A, 622B are engaged with the screw holes 123A, 123B of the portable terminal 100, outputs from the switches 1201 in the screw holes 123A, 123B allow the controller 1200 of the portable terminal 100 to recognize that the USB device has been mounted. Here, a condition to judge that the USB device is being mounted may be any one of the following states: at least one of the switches 1201 in the two screw holes 123A, 123B is turned on, or both of the switches 1201 respectively within the two screw holes 123A, 123B are turned on.

When the portable terminal 100 recognizes that the USB device has been mounted, the controller 1200 controls the power module 1202 to initiate power supplying to the power source terminals 1401 of the USB device from the power supply terminals 122A, 122B. According to this power supply, the USB device is started up. The controller 1402 of the USB device thus started up recognizes the portable terminal 100, transmits a request to establish connection with the portable terminal 100 via the USB connector 1400. Accordingly, a connection establishment processing between the USB device and the portable terminal 100 is executed.

After the connection is established between the USB device and the portable terminal 100, the controller 1402 of the portable terminal 100 authenticates the USB device and performs downloading from the USB device a driver and the like of the USB device, if the USB device is successfully authenticated. Subsequently, the controller 1402 of the portable terminal 100 controls the USB device, using the driver and the like thus received.

It is to be noted that a kind of the USB device may be provided with an internal power supply. For such kind of USB device, it is not necessary for the portable terminal 100 to supply power, even when the switch is pushed down by inserting the USB connector 1400 into the USB port 121. It is thus possible to configure such that in the case where a USB device having the internal power supply is mounted on the portable terminal 100, power supplying from the portable terminal 100 to the USB device may not be performed even when the switches 1201 inside the screw holes are turned on. Specifically, when the switches 1201 is turned on by inserting the USB connecter 1400 into the USB port 121, whereby the controller 1200 of the portable terminal 100 recognizes the mounting of the USB device, then, the controller 1402 of the USB device transmits identification information indicating a machine type of the USB device to the portable terminal 100 via the USB connecter 1400. Accordingly, the controller 1200 of the portable terminal 100 determines whether or not the identification information indicates the machine type having an internal power supply. As a result, if it is determined that the identification information indicates the machine type as having the internal power supply, the power is not supplied to the USB device from the portable terminal. On the other hand, if the identification information indicates the machine type as not having the internal power supply, the power is supplied to the USB device.

ii) Connection End Processing

When the portable terminal 100 transmits a connection end request to the USB device via the USB port 121, the controller 1402 of the USB device executes a connection end processing with the portable terminal 100. Accordingly, the connection between the USB device and the portable terminal 100 is terminated.

When the controller 1200 of the portable terminal 100 detects a disconnection with the USB device, the controller 1200 controls the power module 1202 to stop power supplying from the power supply terminals 122A, 122B to the power source terminals 1401 of the USB device, and deletes the driver and the like of the USB device.

It is to be noted that there is a case where the switches 1201 inside the both screw holes happen to be turned off without passing through the aforementioned connection end processing, such as the case where suddenly the USB device is pulled out. In this occasion, the controller 1200 of the portable terminal 100 detects the disconnection with the USB device, and stops power supplying to the power source terminal 1401 of the USB device from the power supply terminals 122A, 122B.

iii) Control of the USB Device from Application Program

When the connection is established between the USB device and the portable terminal 100, the OS of the portable terminal 100 notifies an application program of the connection establishment with the USB device, in response to a request from the application program. Alternatively, it is also possible that the OS notifies the application program that the USB device is mounted without waiting for the request from the application program. Hereinafter, it is assumed that "the notification from the OS to the application program" may include both the case responding to the request from the application program and the case without waiting for the request from the application program.

When the USB device is mounted on the portable terminal 100, the OS of the portable terminal 100 notifies the application program that there happens an event that the USB device is mounted, that is, the aforementioned condition has been satisfied. This condition indicates, as described above, that at least one of the switches is in a state of ON, or both of the switches are in a state of ON. In the situation above, since the application program is allowed to recognize whether or not the USB device is mounted, it is possible to request the OS to start or stop the power supplying to the USB device as required. For instance, the power supply to the USB device may be started (or once suspended and then started) for the purpose of reconnecting, resetting and the like. In other words, it is substantially possible to establish connection or to end connection with the USB device as a master from the portable terminal 100 side serving as a slave.

iv) Power Management of USB Device

The USB device having already been started enters power management mode, if it is not operated for a predetermined period of time. Specifically, the controller 1402 of the USB device transmits a notice to the portable terminal 100. When this notice is approved (if the portable terminal 100 does not deny the notice), the controller 1402 executes a procedure to end the connection with the portable terminal 100. Accordingly, when the connection between the USB device and the portable terminal 100 is terminated, the controller 1200 of the portable terminal 100 controls the power module 1202, to suspend the power supply to the power source terminals 1401 of the USB device from the power supply terminals 122A, 122B, or the USB device itself automatically turns the power off.

Then, if it is necessary to restart the USB device, the controller 1200 of the portable terminal 100 controls the power module 1202 to restart power supplying to the power source terminals 1401 of the USB device from the power supply terminals 122A, 122B. Then, if the driver and the like of the USB device still remain in the portable terminal 100, transfer of the driver and the like to the portable terminal 100 from the USB device is not executed. In addition, if a configuration parameter of the USB device is set in the portable terminal 100, this parameter is transferred to the USB device from the portable terminal 100. Accordingly, the USB device resumes the status corresponding to the status prior to entering the power management mode.

v) Power Management of the Portable Terminal 100

When the portable terminal 100 is not operated for a predetermined period of time, the controller 1200 of the portable terminal 100 controls the power module 1202 to suspend power supplying to the USB device, and further enters sleep mode. Accordingly, both the portable terminal 100 and the USB device enter the power management mode. With some kinds of USB devices, the portable terminal 100 may continue power supplying to the USB device even while the portable terminal 100 is in the sleep mode, and if there is a notice from the USB device, the portable terminal may resume from the sleep mode in response to the notice. With the configuration as described above, power supplying to the portable phone module, for example, continues even while the portable terminal 100 is in a sleep mode, whereby it is possible to keep the portable phone being in a standby mode. Then, if there is a call-in to the portable phone while the portable phone 100 is in a sleep mode, it may be configured such that the sleep mode of the portable terminal 100 is canceled in response to the notice from the portable phone module. In the present embodiment, two fixing screws are provided in the USB device, and two screw holes 123A, 123B respectively associated with those screws are provided in the portable terminal. However, it is not necessarily limited to this configuration. For example, instead of one fixing screw out of the two fixing screws of the USB device, a positioning pin may be employed. In this case, a screw hole with which the fixing screw of the USB device is engaged, and a positioning hole into which the positioning pin of the USB device is inserted may be formed. In the description above, switches 1201 to detect the mounting of the USB device are provided in the portable terminal 100. However, it is not necessarily limited to this configuration. Instead of providing such switches 1201 to the portable terminal 100, it may be configured such that a library to supply power to the USB device is called, for example, when an application program requesting to utilize the USB device is started up in the portable terminal. Hereinafter, this operation will be explained. In general, a user firstly mounts the USB device on the portable terminal 100, and then, manipulates the operation buttons and the like, thereby starting up the application program for utilizing the USB device, on the portable terminal 100. Here, it is configured such that such application program as described above, on it's starting, calls a library requesting the OS to start supplying power from the power supply terminals 122A, 122B. According to the library call, the functional configuration as shown in FIG. 6 is implemented. However, it is to be noted that, in this occasion, the processing executed by the controller 1200 is different from the aforementioned example in the following points. Immediately after the library is started up, the controller 1200 controls the power module 1202 and initiates supplying power from the power supply terminals 122A, 122B. In other words, unlike the aforementioned example, the controller 1200 initiates the power supplying without determining whether or not the USB device has been mounted. At this stage, if the USB device is mounted on the portable terminal 100, the USB device is started up by the power thus supplied. Accordingly, the USB device implements the functional configuration as shown in FIG. 7, and a processing similar to the aforementioned example is executed. Specifically, the controller 1402 of the USB device outputs a connection establishment request from the USB connector 1400. In response to the connection establishment request, the controller 1200 of the portable terminal 100 executes the connection establishment processing with the controller 1402 of the USB device. When the connection is established between the USB device and the portable terminal 100, the controller 1402 of the portable terminal 100 authenticates the USB device. As a result, if the USB device is successfully authenticated, the controller 1402 of the portable terminal 100 downloads from the USB device the driver and the like thereof. Subsequently, in the portable terminal 100, the controll returns to the application program from the library, and the USB device is available from the application program. On the other hand, if the USB device is not mounted on the portable terminal 100, the connection establishment request from the USB device will not be transmitted to the portable terminal 100. Therefore, the controller 1402 of the portable terminal 100 determines that the USB device has not been mounted yet, after a lapse of a predetermined time of no communication state in the USB port 121, and then returns an error to the application program. The application program outputs from the liquid crystal display 111 and the like, a message prompting the user to mount the USB device and to restart the application program.

In the above description, a character input keyboard module, a portable telephone module, a GPS receiver, and a camera module are taken as specific examples of the USB device. However, a machine implementing any kind of functions may be applied as a USB master according to the present embodiment.

What is claimed is:

1. A portable terminal acting as a USB slave comprising,
a USB port into which a USB connector of a USB device acting as a USB master is inserted;
a power supply terminal which comes into contact with a power source terminal of said USB device in a state that said USB connector is inserted in said USB port and which supplies power to said power source terminal, the power supply terminal being separate from the USB port; and
a controller which initiates said power supplying from said power supply terminal when an application program for utilizing said USB device is started,
wherein said controller establishes a connection with said USB device if said USB port accepts a connection establishment request within a predetermined period of time after said power supplying is initiated, and outputs a message for prompting a mounting of said USB device if said USB port does not accept said connection establishment request within said predetermined period of time.

2. The portable terminal according to claim 1,
wherein said controller determines, when it receives identification information from said USB device indicating a machine type of the USB device, whether or not the machine type has an internal power supply, and stops supplying the power if the machine type is determined as having an internal power supply.

3. A portable terminal according to claim 1,
wherein said controller detects disconnection from said USB device, when said inserted USB connection is pulled out, and stops power supplying to said power source terminal from said power supply terminal 4. A system comprising:
a portable terminal acting as a USB slave including:
a USB port into which a USB connector of a USB device is inserted,
a power supply terminal which comes into contact with a power source terminal of said USB device in a state that said USB connector is inserted in said USB port and which supplies power to said power source terminal, the power supply terminal being separate from the USB port, and
a controller which initiates said power supplying from said power supply terminal when an application program for utilizing said USB device is started,
wherein said controller establishes a connection with said USB device if said USB port accepts a connection establishment request within a predetermined period of time after said power supplying is initiated, and outputs a message for prompting a mounting of said USB device if said USB port does not accept said connection establishment request within said predetermined period of time; and
a USB device, acting as a USB master, mountable on said portable terminal, said USB device including:
a USB connector which is inserted into said USB port of said portable terminal,
a power source terminal which comes into contact with said power supply terminal of said portable terminal in a state that said USB connector is inserted into said USB port to receive said power supplying from said power supply terminal, and
a second controller which outputs a connection establishment request from said USB connector, when said power supplying from said power supply terminal to said power source terminal is initiated.

5. A USB device, which is connected into a portable terminal acting as a USB slave, acting as a USB master, comprising:
a USB connector which is inserted into a USB port of said portable terminal;
a power source terminal which comes into contact with a power supply terminal of said portable terminal in a state that said USB connector is inserted into said USB port, the power source terminal of the USB master device being separate from the USB connector; and
a controller which outputs a connection establishment request from said USB connector, when power supplying from said power supply terminal to said power source terminal is initiated when an application program for utilizing said USB device is started,
wherein said controller transmits said connection establishment request and executes a connection establishment processing between said portable terminal,
when said USB port does not accept said connection establishment request within a predetermined period of time after said power supplying is initiated, a message for prompting a mounting of said USB device is outputted by said portable terminal, and,
when a connection end request is transmitted from said portable terminal, said controller executes a connection end processing.

6. A USB device according to claim 5, in which the USB master device functions as any one of:
i) a character input keyboard module;
ii) a portable phone module;
iii) a GPS receiver; and
iv) a camera module.

7. A USB device, which is connected into a portable terminal acting as a USB slave, acting as a USB master, comprising:
a USB connector which is inserted into a USB port of said portable terminal;
a power source terminal which comes into contact with a power supply terminal of said portable terminal in a state that said USB connector is inserted into said USB port, the power source terminal of the USB master device being separate from the USB connector;
a controller which outputs a connection establishment request from said USB connector, when power supplying from said power supply terminal to said power source terminal is initiated when an application program for utilizing said USB device is started; and
an internal power supply,
wherein said controller transmits identification information to said portable terminal indicative of said internal power supply, and
when said USB port does not accept said connection establishment request within a predetermined period of time after said power supplying is initiated, a message for prompting a mounting of said USB device is outputted by said portable terminal.

8. A USB device according to claim 7, in which the USB master device functions as any one of:
i) a character input keyboard module;
ii) a portable phone module;
iii) a GPS receiver; and
iv) a camera module.

* * * * *